United States Patent
Minuto et al.

(10) Patent No.: US 7,666,942 B2
(45) Date of Patent: Feb. 23, 2010

(54) EXERCISE PUTTY HAVING VARIABLE HARDNESS AND METHOD OF MAKING SAME

(76) Inventors: Maurice Gregory Minuto, 25 Riverview Ter., Smithtown, NY (US) 11787; David W. Bean, 32 Redan Dr., Smithtown, NY (US) 11787

( * ) Notice: Subject to any disclaimer, the term of this patent is extended or adjusted under 35 U.S.C. 154(b) by 0 days.

(21) Appl. No.: 12/454,740

(22) Filed: May 26, 2009

(65) Prior Publication Data

US 2009/0234043 A1    Sep. 17, 2009

Related U.S. Application Data

(63) Continuation of application No. 11/408,532, filed on Apr. 21, 2006.

(51) Int. Cl.
*C08F 220/12* (2006.01)

(52) U.S. Cl. .............. 524/858; 524/857; 524/418; 524/419; 524/438; 524/442; 524/447; 524/379; 524/386; 524/389; 524/404; 524/313; 524/588

(58) Field of Classification Search .......... 524/857, 524/418–419, 438, 442, 447, 858, 379, 386, 524/389, 404, 313, 588
See application file for complete search history.

(56) References Cited

U.S. PATENT DOCUMENTS

| | | | | |
|---|---|---|---|---|
| 5,319,021 A | * | 6/1994 | Christy ............... | 524/857 |
| 5,693,689 A | * | 12/1997 | Gibbon ............... | 523/137 |
| 2005/0250620 A1 | * | 11/2005 | Minuto et al. ...... | 482/49 |

* cited by examiner

*Primary Examiner*—Randy Gulakowski
*Assistant Examiner*—Olatunde S Ojurongbe

(57) ABSTRACT

A therapeutic exercise putty is provided which comprises a uniform mixture of a first mass of putty and modeling clay. The first mass of putty includes hydroxy-terminated polymethylsiloxane having a viscosity of about 20 to about 50,000 cps.

1 Claim, No Drawings

EXERCISE PUTTY HAVING VARIABLE HARDNESS AND METHOD OF MAKING SAME

RELATED APPLICATION

The application is a continuation of application Ser. No. 11/408,532 filed Apr. 21, 2006.

FIELD OF THE INVENTION

The present invention relates generally to exercise putties and is particularly related to such putties which have varying degrees of hardness for use as therapeutic exercise putties. This invention also relates to a method of making such exercise putties with varying degrees of hardness.

BACKGROUND OF THE INVENTION

Exercise putties have found widespread use for manipulative therapeutic purposes in recent years. Such putties are described, for example, in U.S. Pat. No. 5,693,689 issued to Robert M. Gibbon on Dec. 2, 1997 which also describes a kit for packaging putties with different colors and varying degrees of stiffness. Basically, the putties described in said patent comprise a first mass of putty which is a reaction product of polysiloxane and a boron or a tin-containing compound, and at least one additional mass of putty which is a reaction product of a polysiloxane and either (a) a boron or a tin-containing compound, (b) an uncured polyorganodisiloxane gum, or (c) mixtures of (a) and (b). The additional mass has a color and stiffness different from the first mass, and the resulting combined mass has a color and stiffness intermediate the two masses and includes uncured polydiorganosiloxane gum.

The use of polysiloxane-boron compounds for physical therapy is also disclosed in other prior art patents such as, e.g., U.S. Pat. No. 3,677,997 referred to in U.S. Pat. No. 5,319,021, the latter patent also disclosing that modified polysiloxane-boron material is useful for exercising and physical therapy.

Notwithstanding a plethora of patents and publications disclosing a variety of putties which are useful for hand exercise and therapy, the putties presently used have been either expensive to produce or have other deficiencies which have limited their applications.

Therefore, it is an object of the present invention to provide a putty which is particularly well suited as an exercise putty for therapeutic purposes.

It is a further object of the present invention to provide such putties with different degrees of stiffness (or hardness) for therapeutic hand exercises by patients of different strengths.

It is also an object of the present invention to provide a method of making such therapeutic exercise putties.

The foregoing and other objects and advantageous features of the present invention will be more fully comprehended and appreciated from the ensuing detailed description of the invention and the illustrative examples.

SUMMARY OF THE INVENTION

In accordance with the present invention an exercise putty is provided which has therapeutic quality. The final putty is made by mixing ma first mass of putty with modeling clay to obtain a uniform mass of model clay-containing putty. The first mass of putty comprises from about 10 to about 95 weight percent of hydroxy-terminated dimethyl siloxane or hydroxy-terminated polymethylsiloxane having a viscosity of from about 20 to about 50,000 cps, from about 0 to about 50 weight percent of fumed silica, from about 1 to about 50 weight percent boric acid, from about 0 to about 10 weight percent glycerin, from about 0 to about 50 weight percent detackifying oil, and from about 0.5 to about 10 weight percent oleic acid.

The modeling clay mixed with the first mass is known in the art and may vary in composition which includes kaolin. From about 1 to about 15 weight percent, preferably from about 3 to about 10 weight percent of the modeling clay is mixed with the first mass of putty, such as by kneading, until the desired uniform final putty mass is obtained. The putty may be made in different strengths, and pigments may be incorporated into putties of different strength for different degrees of therapeutic exercises.

DETAILED DESCRIPTION OF THE INVENTION

The basic constituent of the composition of the present invention is hydroxy terminated (hydroxy stopped) polyalkylsiloxane where the alkyl group is preferably a methyl group. Thus, the basic constituent of the composition is hydroxy-terminated dimethyl siloxane or hydroxy-terminated polymethylsiloxane having a viscosity of about 20 to about 200,000 cps, preferably from about 50 to 100,000 cps. The final therapeutic putty composition of the present invention is a mixture of a first mass of putty (as hereinafter described) and a mass of "modeling clay". The first mass of putty comprises hydroxy terminated polymethylsiloxane, fumed silica, boric acid, glycerin, detackifying oil such as mineral oil and, additionally may include small amount of oleic acid. The first mass of putty may be made softer by increasing the amount of oleic acid and decreasing the amount of fumed silica, or it may be made harder by decreasing the amount of oleic acid and increasing the amount of fumed silica. The amounts of the different components of the first mass of putty may vary to some extent. Thus, the amount of hydroxy terminated polymethylsiloxane may vary from about 10% to about 95%, preferably from about 50% to about 80%, the amount of fumed silica may vary from about 0% to about 50%, preferably from about 5% to about 15%, the amount of boric acid may vary from about 5% to about 50%, preferably from about 10% to about 20%, the amount of glycerin may vary from about 0% to about 10%, preferably from about 2% to about 4%, the amount of the detackifying oil (mineral oil) may vary from 0% to about 50%, preferably from about 1% to about 10%, and the amount of oleic acid may vary from about 0.5% to about 10%, preferably from about 1.5% to about 5%, all percentages being on weight basis. Extending fillers such as quartz and calcium carbonate may be added to reduce the cost per unit weight of the putty.

In accordance with this invention, the first mass of putty is mixed with modeling clay in the desired proportions. Usually from about 1% to about 15%, preferably from about 3% to about 10% of modeling clay is mixed thoroughly with the first mass of putty to obtain the final putty composition, said percentage also being on weight percent basis.

Modeling clay is typically a mixture of clay (e.g., kaolin) sulfur and suitable greases, or greases plus waxes. Exemplary formulations of modeling clay are:

Formula 1

| | | |
|---|---|---|
| Kaolin | 67 oz | (1899.418 g) |
| Sulfur | 33 oz | (935.534 g) |

-continued

| | | |
|---|---|---|
| Lanolin | 60 oz | (1700.971 g) |
| Glycerol | 40 oz | (1133.980 g) |

The sulfur may be wholly substituted by kaolin,
but it does act as an antiseptic Formula 2

| | | |
|---|---|---|
| Glycery Oleate | 10 oz. | (283.495 g) |
| Red Oil | 50 oz | (1417.476 g) |
| Beeswax, Crude | 20 oz | (566.990 g) |
| Castor Oil | 15 oz | (425.242 g) |

Pipe-Clay, Powered sufficient to suit

Formula 3

| | | |
|---|---|---|
| Tallow | 19 oz | (538.640 g) |
| Gum Mastic | 30 oz | (850.485 g) |
| Beeswax, Crude | 3 oz | (85.0485 g) |
| Ozokerite | 2 oz | (56.6990 g) |
| Paraffin Wax | 4 oz | (113.398 g) |
| Gypsum | 12 oz | (340.194 g) |
| Pipe Clay | 60 oz | (1700.971 g) |

Formula 4

| | | |
|---|---|---|
| Plastic Clay | 46 oz | (1304.078 g) |
| Cup Grease | 24 oz | (680.388 g) |
| Paraffin Wax | 11 oz | (311.844 g) |
| Rosin Oil | 1 oz | (28.3495 g) |

While the aforementioned formulae describe exemplary formulations of model clay, such compositions and their amounts may vary and, in general, they are known in the prior art. The present invention is based on the incorporation of model clay into the putty mass to form the desired exercise putty of different strengths.

In producing the final mass of putty, the first mass of putty and the modeling clay may be thoroughly mixed, as by kneading, to obtain a uniform mass of clay-containing putty. Different gradations of final putty, having different degrees of stiffness can thus be produced and each grade may be mixed with a colorant such as a pigment in order to designate each putty by reference to its hardness/softness characteristic. The different colored putties are prescribed for different therapeutic disciplines depending on the strength or weakness of the patient.

In order to form the first putty mass the various ingredients may be charged to a conventional reaction vessel and the mixture mixed thoroughly to obtain a uniform mass of the putty. This putty mass is then mixed with the modeling clay in a pre-determined proportions, and the mixture is kneaded to obtain a uniform mass of clay-containing putty which can serve as the therapeutic putty.

From the foregoing detailed description of the invention it can be realized that changes and modifications can be made in the selection of ingredients which are nevertheless within the scope of, and are suggested from the disclosure herein.

The invention claimed is:

1. A therapeutic exercise putty comprising a uniform mixture of a first mass and a second mass, said first mass comprising from about 10 to about 95 weight percent of hydroxyl-terminated polymethylsiloxane having a viscosity of from about 20 to about 200,000 cps, from about 0 to about 50 weight percent fumed silica, from about 5 to about 50 weight percent boric acid, from about 0 to about 10 weight percent of glycerin, from about 0 to about 50 weight percent detackifying oil, and from about 1 to about 10 weight percent oleic acid,
    said second mass being a modeling clay uniformly mixed with said first mass in the amount of about 1 weight percent to about 15 weight percent based on the weight of said first mass,
    said modeling clay comprising kaolin, sulfur, lanolin and glycerol.

* * * * *